United States Patent Office 3,493,424
Patented Feb. 3, 1970

3,493,424
FIBROUS MATERIAL TREATED WITH A SOLID SILSESQUIOXANE AND A PROCESS OF MAKING THE SAME
Sharon R. Mohrlok, Lansing, and Gerald P. Yates, Midland, Mich., assignors to Dow Corning Corporation, Midland, Mich., a corporation of Michigan
No Drawing. Continuation-in-part of abandoned application Ser. No. 445,747, Apr. 5, 1965, which is a continuation of abandoned application Ser. No. 427,175, Jan. 21, 1965. This application Jan. 25, 1967, Ser. No. 611,578
Int. Cl. B44d 1/44
U.S. Cl. 117—126          31 Claims

ABSTRACT OF THE DISCLOSURE

Fibrous materials are given antislip, dulling and/or dry-soiling resistance properties by applying a colloidal suspension of a silicone of the unit formula $RSiO_{3/2}$, wherein R is a hydrocarbon or substituted hydrocarbon radical containing from 1 to 7 carbon atoms, and then drying the material.

---

This application is a continuation-in-part of our abandoned application Ser. No. 445,747, filed Apr. 5, 1965, which is a continuation of our abandoned application Ser. No. 427,175, filed Jan. 21, 1965.

Much time and effort has been expended in search of treatments for fibrous materials, such as filaments, fibers, fabrics and carpets, which impart various and sundry desirable properties to the fibrous materials. This invention is directed to a process for the treatment of a fibrous material, particularly a fabric or carpeting, that imparts antislip, dulling and/or dry-soiling resistance to the material. This invention is also directed to the treated fibrous material. More specifically, this invention relates to a process for the treatment of a fibrous material, and the resulting product, which comprises applying to the fibrous material a colloidal suspension of a solid silsesquioxane having the unit formula $RSiO_{3/2}$, wherein R is a member selected from the group consisting of hydrocarbon and substituted hydrocarbon radicals containing from 1 to 7 carbon atoms, said silsesquioxane having a particle size in the range of 10 to 1000 A., and then drying the fibrous material.

The process of this invention can be used for the treatment of any fibrous material whether it be of natural or synthetic origin. Like any of the currently available treatments, the process and various silsesquioxanes of this invention perform better on some fibrous materials than on others. Nonetheless, the treatment made in accordance with the process of this invention imparts improved antislip, dulling and/or dry-soiling resistant properties to all fibrous materials. The fibrous materials that can be treated employing the process of this invention are, for example, those made from wool, jute, flax, asbestos, cotton, rayon, nylon, acrylics, polyacrylonitrile, polyvinylidene chloride, polyesters, cellulose acetate, glass and mixtures or blends thereof.

As stated above, the fibrous material is treated with a colloidal suspension of a solid silsesquioxane having the unit formula $RSiO_{3/2}$ wherein R is a hydrocarbon or substituted hydrocarbon radical containing from 1 to 7 carbon atoms. By a "solid" silsesquioxane it is meant that the silsesquioxane is neither gaseous or liquid. For best results, upon evaporation of the colloidal suspension the silsesquioxane that is deposited should be a friable or brittle solid, the former being preferred. Of course, mixtures and copolymers of the silsesquioxanes can be employed if so desired. The average particle size of the silsesquioxanes in the colloidal suspension must be within the range of 10 to 1000 A. and is preferably in the range of 10 to 400 A.

The R radical of the silsesquioxane can be an alkyl, alkenyl, alkynyl, cycloalkyl, aryl, alkaryl or an aralkyl radical, and these radicals can contain substituents such as halogen atoms or amino, mercapto, hydroxyl, epoxy, acrylato, cyano and carboxy substituents so long as there are no more than seven carbon atoms in the radical. Specific illustrative examples of the R radical are the methyl, ethyl, propyl, butyl, amyl, hexyl, heptyl, vinyl, allyl, hexenyl, propargyl, cyclohexyl, phenyl, tolyl, benzyl, chloromethyl, 3,3,3 - trifluoropropyl, dichlorophenyl, aminopropyl, aminobutyl, $H_2NCH_2CH_2NH(CH_2)_3$—, $H_2NCH_2CH_2NHCH_2CH(CH_3)CH_2$— mercaptopropyl, mercaptoethyl, hydroxypropyl,

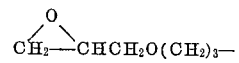

$CH_2$=$CHCOO(CH_2)_3$—, $CH_2$=$C(CH_3)COO(CH_2)_3$—, cyanopropyl, cyanoethyl, carboxyethyl and carboxyphenyl radicals. Of course, the substituents on the hydrocarbon radicals should not be reactive with water, nor with one another in the case of copolymers. The methyl and mercaptopropyl are preferred when a single silsesquioxane is used. When R is other than a methyl or mercaptopropyl radical it is preferred that the silsesquioxane be copolymerized with methyl silsesquioxane in a weight ratio of from 5 to 30:70 to 95, i.e., 5 to 30% by weight of $RSiO_{3/2}$ units and 70 to 95% by weight of $CH_3SiO_{3/2}$ units.

The colloidal suspensions used in the process of this invention are prepared by adding a silane having the formula $RSi(OR'')_3$, wherein R'' is an alkyl group containing 1 to 4 carbon atoms (i.e., a methyl, ethyl, isopropyl or butyl group) or a

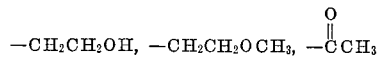

or a —$CH_2CH_2OC_2H_5$ group, to a water-surfactant mixture with agitation under acidic or basic conditions. The surfactant used in the silsesquioxane preparation must be either anionic or cationic in nature as defined in the application below. However, best results in accordance with this invention are generally obtained with the cationic suspensions. The suspensions can also be neutralized after preparation if so desired. The amount of silane employed should be less than about 10% by weight based on the combined weights of the silane, water and surfactant although up to about 35% by weight of silane can be employed if it is added to the water-surfactant mixture at the rate of less than one mol of silane per hour. A more detailed description of how the colloidal suspensions of the silsesquioxanes can be prepared is found in abandoned U.S. patent application Ser. No. 427,077, filed Jan. 21, 1965, by Joseph Cekada, Jr., and Donald R. Weyenberg and entitled, "Colloidal Silsesquioxanes and Methods for Making Same"; the disclosure of which is incorporated herein by reference.

The colloidal suspensions can be applied to the fibrous materials in any desired manner. For example, the fibers can be dipped in or passed through the suspension, or the suspension can be padded, brushed, sprinkled or sprayed onto the fibrous material. At the present time the preferred method of applying the suspension is to spray it onto the material, for example from an aerosol.

Another way in which the colloidal suspension can be applied to the material is to incorporate it in a cleaning formulation. This is a particularly useful means, for example, for applying the suspensions to rugs or carpeting once they are in place in a home or business establishment since it allows one to both clean and impart dry-soiling resistance to the material in one operation. Best results are usually obtained, however, by first cleaning the carpeting and then applying the silsesquioxane.

As pointed out above, the colloidal suspension can be applied to the material by the consumer. However, the colloidal suspensions can also be applied to cloth or carpeting, for example, at the place of manufacture. It is also possible to apply the colloidal suspensions to the yarn prior to its use in making the finished article. Other points of application will be apparent to those skilled in the art.

Generally speaking, it is preferred that the silsesquioxane be applied to the fibrous material in a quantity in the range of 0.1 to 1.5 g. of silsesquioxane solids per square foot of material. Optimum results can usually be obtained when the amount applied is in the range of 0.3 to 0.6 g. per square foot. Although more can be applied, the additional advantage is not justified by the increased cost. Also, when the silsesquioxane is employed in a cleaning formulation, a rug or carpet shampoo for example, it is preferred that at least 0.4 g. per square foot be applied. The concentration of the silsesquioxane in the colloidal suspension is not critical and is immaterial to the process.

After the colloidal suspension has been applied, the fibrous material is dried. Drying can be accomplished by any suitable means. For example, the simplest means of drying involves exposing the treated fibrous material to the air and allowing the water to evaporate. Of course, the drying can be accelerated by blowing air or some other suitable gas (particularly a gas that has been heated) across the material. Drying can also be accomplished by passing the treated material through an oven. Other means of drying the material will be obvious to those skilled in the art.

In order that those skilled in the art may better understand how the present invention can be practiced, the following examples are given by way of illustration and not by way of limitation.

All parts and percents referred to herein are on a weight basis unless otherwise specified.

EXAMPLE 1

Aerosols of colloidal suspensions of $CH_3SiO_{3/2}$, $C_2H_5SiO_{3/2}$, $CF_3CH_2CH_2SiO_{3/2}$, a mixture of $CH_3SiO_{3/2}$ and $C_2H_5SiO_{3/2}$, and a mixture of $CH_3SiO_{3/2}$ and $CF_3CH_2CH_2SiO_{3/2}$ were prepared which contained 1½% silsesquioxane solids. The silsesquioxanes had a particle size in the range of 10 to 1000 A. These aerosols were sprayed onto 6-inch squares of wool carpeting, so as to apply about 0.4 g. of silsesquioxane solids per square foot of carpeting and then the carpet was air dried. These treated squares of carpet along with an untreated control square were mounted on a board and then dragged up and down a concrete hallway to dirty them. The squares were then vacuumed to remove any loose dirt and examined for dry-soiling resistance. All of the squares that had been treated by the process of this invention were much cleaner than the untreated control square.

EXAMPLE 2

A portion of 100% wool carpeting and a portion of 100% acrylic carpeting was sprayed with an aerosol of a colloidal suspension of $CH_3SiO_{3/2}$ in the manner of Example 1 and then air dried. An adjacent portion of each piece of carpeting was left untreated for purposes of comparison. These pieces of carpet were glued to a concrete hallway floor, in a heavy traffic area near an entrance, to test their dry-soiling resistance. These pieces of carpet were vacuumed several times a week for two weeks, shampooed and left for another week during which time they were vacuumed several times, shampooed again and re- treated with the colloidal suspension of the silsesquioxane as before, left for three more days of traffic, vacuumed, and then examined for dry-soiling resistance. The treated portions of both carpets were found to be significantly cleaner than the control portions of the carpet.

EXAMPLE 3

A mixture of 1106 g. of distilled water and 14 g. of dodecylbenzene sulfonic acid was placed in a flask and heated to 60° C. Then 280 g. of $CH_3Si(OCH_3)_3$ was added dropwise to the flask, with agitation, at the rate of about 60 g. per hour. After addition of the silane was complete, agitation was continued overnight with the temperature being maintained at 60° C. The next day the resulting colloidal suspension was filtered, allowed to cool to 30° C. and neutralized with ammonium hydroxide. The product was a colloidal suspension of $CH_3SiO_{3/2}$ wherein the particle size of the silsesquioxane was about 100 A.

EXAMPLE 4

The colloidal suspension of Example 3 was placed in an aerosol container. A piece of ash beige wool carpeting was obtained and part of it sprayed with the colloidal suspension of the silsesquioxane so that 0.4 g. of silsesquioxane solids per square foot of carpeting was applied. Another piece of carpet was left untreated for purposes of comparison. After the treatment, the carpet was air dried and then placed in a clockroom of an industrial plant to test the dry-soiling resistance of the treatment. After 3 days of traffic, the carpet was taken up and vacuumed. The portion of the carpet that had been treated with the colloidal suspension of the silsesquioxane of this invention was found to be much cleaner than the control portion.

The above process was repeated except that a piece of white Acrilan (acrylic) carpet was used instead of the wool carpet, 0.5 g. of silsesquioxane solids per square foot of carpeting was applied and the carpet was left in the clockroom for 5 days. The treated portion of the carpet was the cleanest showing only very light soiling after vacuuming whereas the control portion was dark grey in color.

EXAMPLE 5

The procedure of Example 4 was repeated on three identical pieces of white acrylic carpet except that colloidal suspensions of $CH_3SiO_{3/2}$ having different particle sizes were employed. Specifically, in two of the suspensions the average particle size of the silsesquioxane was about 250 A. and in the other suspension the average particle size of the silsesquioxane was about 500 A. All of these pieces of carpet were cleaner than the control after the 5 days of testing for dry-soiling resistance.

EXAMPLE 6

The procedure of Example 4 was repeated on a piece of white acrylic carpet except that a colloidal suspension of $CH_3SiO_{3/2}$ wherein the particle size of the silsesquioxane was about 1000 A. was employed and 0.4 g. of silsesquioxane solids per square foot of carpet was applied. This piece of treated carpet was cleaner than the control after the 5 days of testing for dry-soiling resistance.

EXAMPLE 7

Pieces of cotton cloth were aerosol sprayed with colloidal suspensions containing 1½% of $CH_3SiO_{3/2}$ or $C_2H_5SiO_{3/2}$ solids. The particle size of the silsesquioxanes was in the range of 10 to 1000 A. Other pieces of the cotton cloth were dipped into colloidal suspensions containing from 0.01 to 5.0% $CH_3SiO_{3/2}$ solids. After the above treatments the cloth was air dried. Still other pieces of the cotton cloth were left untreated for purposes of comparison.

The above pieces of cotton cloth were added to a one gallon jug containing dirt which had been gathered from a parking lot and to which a small amount of carbon black and four marbles had been added. The pieces of cloth were shaken with the dirt for about 5 minutes, removed from the jug, shaken to remove adhering dirt, and then examined for dry-soiling resistance. The pieces of cloth treated with the colloidal suspensions of the silsesquioxanes were found to be significantly cleaner than the pieces which received no treatment.

was compared and rated as above. The initial anti-slip properties were also compared by sliding the fabrics between the thumb and forefinger. The slippage was rated on a scale of 1–4 where a rating of 1 is "least slippage" and a rating of 4 is "most slippage." The particular silsesquioxane, the percent silsesquioxane solids in the treating suspension, the percent silsesquioxane solids picked-up by the fabric, and the test results are set forth in the table below where No. 1 and No. 2 indicate the two fiber glass fabrics.

| Silsesquioxane | Percent Solids | Percent Pick-up | Dullness | | | | Antislip | |
| --- | --- | --- | --- | --- | --- | --- | --- | --- |
| | | | Initial | | One Wash | | | |
| | | | No. 1 | No. 2 | No. 1 | No. 2 | No. 1 | No. 2 |
| (A) $CH_3SiO_{3/2}$ | 2.5 | 0.67 | 3 | 2 | 3 | 2 | 2 | 1 |
| (B) $C_2H_5SiO_{3/2}$ | 2.5 | 0.67 | 2 | 3 | 2 | 2 | 3 | 2 |
| (C) $C_6H_5SiO_{3/2}$ | 1.7 | 0.56 | 1 | 1 | 1 | 1 | 3 | 3 |
| (D) None | | | 4 | 4 | 4 | 4 | 4 | 4 |

EXAMPLE 8

A colloidal suspension of $CH_3SiO_{3/2}$ having a particle size in the range of 10 to 1000 A. was incorporated into a commercial carpet cleaning shampoo and then the shampoo was used to clean a piece of light beige Orlon (polyacrylonitrile) carpet in the manner recommended by the manufacturer of the shampoo. As a result, 0.6 g. of silsesquioxane solids per square foot of carpet was applied during the cleaning process. Another piece of the same carpet was shampooed in the same manner for purposes of comparison except that the shampoo was used as manufactured (i.e., this shampoo contained no added silsesquioxane).

These pieces of carpet were tested for dry-soiling resistance in the same manner as the acrylic carpeting of Example 4. After the 5 days of the test, the carpet treated with the colloidal suspension was much cleaner than the control. The treated carpet looked almost like new whereas the untreated carpet was very dirty and looked dark gray.

EXAMPLE 9

Swatches of a casement fiber glass fabric were treated with colloidal suspensions of methyl, ethyl and phenyl silsesquioxanes wherein the particle size of the silsesquioxane was in the range of 10 to 1000 A. The suspensions were applied to the swatches by padding at 40 p.s.i. and then the swatches dried and cured for 3 minutes at 300° F. The dullness of the treated and untreated swatches were compared and rated on a scale of 1–4, where a rating of 1 is "dull" and a rating of 4 is "glossy." These swatches were then given one hand wash and rinse in warm water, allowed to drip-dry, and then compared and rated again. The particular silsesquioxane, the percent silsesquioxane solids in the treating suspension, the percent silsesquioxane solids picked up by the fabric, and the test results are set forth in the table below.

| Silsesquioxane | Percent solids | Percent pick-up | Dullness | |
| --- | --- | --- | --- | --- |
| | | | Initial | One wash |
| (A) $CH_3SiO_{3/2}$ | 3 | 1 | 2 | 2 |
| (B) $C_2H_5SiO_{3/2}$ | 3 | 1 | 3 | 3 |
| (C) $C_6H_5SiO_{3/2}$ | 2 | 0.7 | 3 | 3 |
| (D) None | | | 4 | 4 |

EXAMPLE 10

Swatches of two Beta 116 fiber glass fabrics were treated with the colloidal suspensions of methyl, ethyl and phenyl silsesquioxane in the same manner as described in Example 9. The dullness of the treated and untreated swatches

EXAMPLE 11

When colloidal suspensions of $CH_2{=}CHSiO_{3/2}$ or $C_6H_5SiO_{3/2}$, wherein the particle size of the silsequioxane is in the range of 10 to 1000 A., are substituted for the colloidal suspensions in any of the preceding examples, equivalent results are obtained.

EXAMPLE 12

The synthetic dirt used in this example was prepared as follows. 748 g. of 30 mesh peat moss, 109 g. of calcium carbonate, 21 g. of silica, 21 g. of cement, 21 g. of kaolin clay, 5 g. of furnace black and 1 g. of red iron oxide were placed in a bucket and mixed by hand. The mixture was then put into two Pyrex dishes and dried in a 100° C. oven for two hours. The mixture was then placed in a ball mill for two hours, 11 g. of mineral oil having been added at the end of the first hour.

Three different types of carpets were treated. One was a pale green, cut twist, wool carpet with a ⅝" pile. Another was a light yellow, cut, acrylic carpet with a ½" pile. The other was a light tan, loop, nylon carpet with a ⅜" pile. One-half of 6" x 6" pieces of these carpets were sprayed at 40 p.s.i. with various silsesquioxane suspensions containing 0.34% silsequioxane solids. The solids pick-up was 3.6 g. per square yard. After the treatment the samples were dried at 100° C. for 60 minutes and then rolled for 30 minutes in a 30-gallon drum containing 20% of the above described synthetic dirt and 25 No. 7 rubber stoppers. After soiling in this manner the samples were cleaned carefully with a vacuum sweeper, and then rated, treated side versus untreated side, by means of a photoelectric reflection meter (Model 610 by Photovolt Corporation). The reflectance of untreated, unsoiled, carpet was also measured. The effectiveness of the treatment was then determined using the following formula and the reflectance readings.

$$\frac{\text{Treated (soiled)} - \text{Untreated (soiled)}}{\text{Untreated (unsoiled)} - \text{Untreated (soiled)}} \times 100 = \text{Rating}$$

The higher the rating the better the treatment. In the table below the results obtained on the various carpets with various silsequioxane homopolymers and copolymers are set forth. When a copolymer was used the weight ratio of the substituted hydrocarbon units to the monomethyl units is given. The type of suspension is also indicated.

| Sample | Silsesquioxane unit(s) | Weight ratio of units | Suspension, type | Carpet and rating | | |
|---|---|---|---|---|---|---|
| | | | | Wool | Acrylic | Nylon |
| A | $CF_3CH_2CH_2SiO_{3/2}$ | | Cationic | 4 | | 21 |
| B | $CF_3CH_2CH_2SiO_{3/2}$ | | Anionic | | | 9 |
| C | $CF_3CH_2CH_2SiO_{3/2}CH_3SiO_{3/2}$ | 30/70 | Cationic | 59 | 65 | 61 |
| D | $CF_3CH_2CH_2SiO_{3/2}CH_3SiO_{3/2}$ | 15/85 | ___do___ | 68 | 61 | 61 |
| E | $CF_3CH_2CH_2SiO_{3/2}CH_3SiO_{3/2}$ | 5/95 | ___do___ | 56 | 69 | 59 |
| F | $H_2NCH_2CH_2NH(CH_2)_3SiO_{3/2}$ | | ___do___ | | 7 | 9 |
| G | $H_2NCH_2CH_2NH(CH_2)_3SiO_{3/2}CH_3SiO_{3/2}$ | 30/70 | ___do___ | 23 | 85 | 35 |
| H | $H_2NCH_2CH_2NH(CH_2)_3SiO_{3/2}CH_3SiO_{3/2}$ | 15/85 | ___do___ | 54 | 73 | 62 |
| I | $H_2NCH_2CH_2NH(CH_2)_3SiO_{3/2}CH_3SiO_{3/2}$ | 5/95 | ___do___ | 52 | 61 | 64 |
| J | $H_2NCH_2CH_2NH(CH_2)_3SiO_{3/2}CH_3SiO_{3/2}$ | 30/70 | Neutralized cationic | 2 | 7 | 9 |
| K | $H_2NCH_2CH_2NH(CH_2)_3SiO_{3/2}CH_3SiO_{3/2}$ | 15/85 | ___do___ | 42 | 31 | 40 |
| L | $HS(CH_2)_3SiO_{3/2}$ | | Cationic | 61 | 99 | 73 |
| M | $HS(CH_2)_3SiO_{3/2}CH_3SiO_{3/2}$ | 30/70 | ___do___ | 57 | 65 | 59 |
| N | $HS(CH_2)_3SiO_{3/2}CH_3SiO_{3/2}$ | 15/85 | ___do___ | 62 | 47 | 62 |
| O | $HS(CH_2)_3SiO_{3/2}CH_3SiO_{3/2}$ | 5/95 | ___do___ | 63 | 64 | 55 |
| P | $Cl(CH_2)_3SiO_{3/2}$ | | Anionic | 46 | 14 | 18 |
| Q | $Cl(CH_2)_3SiO_{3/2}CH_3SiO_{3/2}$ | 30/70 | Cationic | 52 | 49 | 56 |
| R | $Cl(CH_2)_3SiO_{3/2}CH_3SiO_{3/2}$ | 15/85 | ___do___ | 59 | 45 | 61 |
| S | $Cl(CH_2)_3SiO_{3/2}CH_3SiO_{3/2}$ | 5/95 | ___do___ | 54 | 53 | 59 |
| T | $CH_3CH_2CH_2SiO_{3/2}$ | | ___do___ | | | 2 |

EXAMPLE 13

A series of 2″ x 2″ pieces of $80^2$ white cotton fabric were saturated with various silsesquioxane suspensions and then dried in an oven at 54° C. The treated pieces of cotton and an untreated piece were then secured to the inside surface of a 2-gallon drum, which contained some stones and dirt, and the drum rolled for 30 minutes. The samples were then removed, the loose dirt brushed off, and samples subjectively rated on a scale of 1 to 4 with 1 being good, 4 being poor and the control (untreated sample) being rated as 3. The results are set forth in the table below. The silsesquioxane used, the weight ratio of unsubstituted hydrocarbon units to monomethyl units in the copolymers and the type of suspension are also specified. All the suspensions employed were neutralized prior to use except G, L and M.

In the following examples suspensions of various silsesquioxanes were aerosoled at 0.375% solids and then sprayed on one-half of an 18″ x 18″ piece of carpet to give a surface coating of 0.17 g. per square foot of carpet. The pieces of carpet were then secured to 20″ x 20″ pieces of Masonite and placed in a laboratory hallway. Periodically (several days to several weeks) the samples were vacuumed and evaluated for soiling resistance. The samples were ranked from best (1) to worst (highest number of samples). In these examples all treated portions of the carpets were found to be better than the untreated portions for soiling resistance. The results are set forth in tabular form in the examples. The silsesquioxanes employed are identified in the tables as in the two previous examples.

| Sample | Silsesquioxane unit(s) | Weight ratio of units | Suspension type | Rating |
|---|---|---|---|---|
| A | $HS(CH_2)_3SiO_{3/2}CH_3SiO_{3/2}$ | 5/95 | Cationic | 1 |
| B | $HS(CH_2)_3SiO_{3/2}CH_3SiO_{3/2}$ | 5/95 | Anionic | 1 |
| C | $HS(CH_2)_3SiO_{3/2}CH_3SiO_{3/2}$ | 10/90 | ___do___ | 1 |
| D | $HS(CH_2)_3SiO_{3/2}CH_3SiO_{3/2}$ | 20/80 | ___do___ | 1 |
| E | $HS(CH_2)_3SiO_{3/2}CH_3SiO_{3/2}$ | 30/70 | ___do___ | 2 |
| F | $CH_3SiO_{3/2}$ | | Cationic | 1 |
| G | $CH_3CH_2CH_2SiO_{3/2}$ | | Anionic | 4 |
| H | $CH_3(CH_2)_3SiO_{2/3}CH_3SiO_{3/2}$ | 5/95 | Cationic | 1 |
| I | $CH_3(CH_2)_3SiO_{3/2}CH_3SiO_{3/2}$ | 5/95 | Anionic | 1 |
| J | $CH_3(CH_2)_3SiO_{3/2}CH_3SiO_{3/2}$ | 30/70 | Cationic | 1 |
| K | $CH_3(CH_2)_3SiO_{3/2}CH_3SiO_{3/2}$ | 30/70 | Anionic | 3 |
| L | $H_2NCH_2CH_2NH(CH_2)_3SiO_{3/2}CH_3SiO_{3/2}$ | 5/95 | ___do___ | 1 |
| M | $H_2CH_2CH_2NH(CH_2)_3SiO_{3/2}CH_3SiO_{3/2}$ | 30/70 | Cationic | 3 |
| N | $CH_2=C(CH_3)COO(CH_2)_3SiO_{3/2}CH_3SiO_{3/2}$ | 5/95 | Anionic | 2 |
| O | $CH_2=C(CH_3)COO(CH_2)_3SiO_{3/2}CH_3SiO_{3/2}$ | 30/70 | ___do___ | 4 |
| P | $\overset{O}{\underset{CH_2}{\triangle}}CHCH_2O(CH_2)_3SiO_{3/2}$ $CH_3SiO_{3/2}$ | 5/95 | ___do___ | 2 |
| Q | $\overset{O}{\underset{CH_2}{\triangle}}CHCH_2O(CH_2)_3SiO_{3/2}$ $CH_3SiO_{3/2}$ | 30/70 | ___do___ | 4 |

EXAMPLE 14

In this example nylon carpeting was used and all suspensions except A and D were neutralized before use.

| Sample | Silsesquioxane unit(s) | Weight ratio of units | Suspension, type | Rank |
|---|---|---|---|---|
| A | $H_2NCH_2CH_2NH(CH_2)_3SiO_{3/2}CH_3SiO_{3/2}$ | 30/70 | Cationic | 1 |
| B | $CH_3SiO_{3/2}$ | | ___do___ | 2 |
| C | $CH_3(CH_2)_3SiO_{3/2}CH_3SiO_{3/2}$ | 5/95 | ___do___ | 2 |
| D | $H_2NCH_2CH_2NH(CH_2)_3SiO_{3/2}CH_3SiO_{3/2}$ | 5/95 | Anionic | 2 |
| E | $CH_3(CH_2)_3SiO_{3/2}CH_3SiO_{3/2}$ | 30/70 | Cationic | 5 |
| F | $HS(CH_2)_3SiO_{3/2}CH_3SiO_{3/2}$ | 20/80 | Anionic | 6 |
| G | $CH_3(CH_2)_3SiO_{3/2}CH_3SiO_{3/2}$ | 5/95 | ___do___ | 7 |
| H | $HS(CH_2)_3SiO_{3/2}CH_3SiO_{3/2}$ | 10/90 | ___do___ | 8 |
| I | $HS(CH_2)_3SiO_{3/2}CH_3SiO_{3/2}$ | 5/95 | ___do___ | 9 |
| J | $HS(CH_2)_3SiO_{3/2}CH_3SiO_{3/2}$ | 30/70 | ___do___ | 10 |
| K | $\overset{O}{\underset{CH_2}{\triangle}}CHCH_2O(CH_2)_3SiO_{3/2}$ $CH_3SiO_{3/2}$ | 30/70 | ___do___ | 11 |

EXAMPLE 15

In this example wool carpeting was used and all suspensions neutralized before use.

| Sample | Silsesquioxane unit(s) | Weight ratio of units | Suspension, type | Rank |
|---|---|---|---|---|
| A | $HS(CH_2)_3SiO_{3/2}$ $CH_3SiO_{3/2}$ | 5/95 | Cationic | 1 |
| B | $HS(CH_2)_3SiO_{3/2}$ $CH_3SiO_{3/2}$ | 5/95 | Anionic | 2 |
| C | $CH_3SiO_{3/2}$ | | Cationic | 3 |
| D | $CH_3SiO_{3/2}$ | | Anionic | 4 |

EXAMPLE 16

In this example acrylic carpeting was used and all suspensions except A were neutralized before use.

| Sample | Silsesquioxane unit(s) | Weight ratio of units | Suspension, type | Rank |
|---|---|---|---|---|
| A | $H_2NCH_2CH_2NH(CH_2)_3SiO_{3/2}$ $CH_3SiO_{3/2}$ | 30/70 | Cationic | 1 |
| B | $HS(CH_2)_3SiO_{3/2}$ $CH_3SiO_{3/2}$ | 5/95 | do | 2 |
| C | $CH_3SiO_{3/2}$ | | Anionic | 3 |
| D | $HS(CH_2)_3SiO_{3/2}$ $CH_3SiO_{3/2}$ | 5/95 | do | 4 |

EXAMPLE 17

In this example acrylic carpeting was used and none of the suspensions were neutralized before use. All the suspensions were cationic and contained copolymers of $H_2NCH_2CH_2NH(CH_2)_3SiO_{3/2}$ and $CH_3SiO_{3/2}$ units in the following weight ratios: A, 10/90, B, 20/80, C 5/95, and D, 30/70. A was the best with the remainder being about equal.

EXAMPLE 18

Example 17 was repeated except that nylon carpeting was used. In this instance B ranked the best, D second, A third and C fourth.

EXAMPLE 19

Example 17 was repeated again except that wool carpeting was used. In this instance A ranked best, D second, B third and C fourth.

That which is claimed is:

1. A process for the treatment of a fibrous material to impart antislip, dulling and/or dry-soiling resistance thereto which comprises applying to the fibrous material an aqueous colloidal suspension of a solid silsesquioxane having the unit formula $RSiO_{3/2}$, wherein R is a member selected from the group consisting of hydrocarbon and substituted-hydrocarbon radicals containing from 1 to 7 carbon atoms, said silsesquioxane having been prepared by emulsion polymerization and having a particle size in the range of 10 to 1,000 A., and then drying the treated fibrous material.

2. The process of claim 1 wherein R is a methyl radical.

3. The process of claim 1 wherein R is a phenyl radical.

4. The process of claim 1 wherein R is a mercaptopropyl radical.

5. The process of claim 1 wherein the silsesquioxane is a copolymer of $CH_3SiO_{3/2}$ and $HS(CH_2)_3SiO_{3/2}$ units.

6. The process of claim 1 wherein the silsesquioxane is a copolymer of $CH_3SiO_{3/2}$ and $$H_2NCH_2CH_2NH(CH_2)_3SiO_{3/2}$$

units.

7. The process of claim 1 wherein the fibrous material is a fabric and the silsesquioxane has a particle size in the range of 10 to 400 A.

8. The process of claim 7 wherein R is a methyl radical.

9. The process of claim 7 wherein R is a phenyl radical.

10. The process of claim 7 wherein R is a mercaptopropyl radical.

11. The process of claim 7 wherein the silsesquioxane is a copolymer of 70–95% by weight of $CH_3SiO_{3/2}$ units and 5–30% by weight of $HS(CH_2)_3SiO_{3/2}$ units.

12. The process of claim 7 wherein the silsesquioxane is a copolymer of 70–95% by weight of $CH_3SiO_{3/2}$ units and 5–30% by weight of $H_2NCH_2CH_2NH(CH_2)_3SiO_{3/2}$ units.

13. The process of claim 1 wherein the fibrous material is carpeting.

14. The process of claim 13 wherein the silsesquioxane has a particle size in the range of 10 to 400 A.

15. The process of claim 14 wherein R is a methyl radical.

16. The process of claim 14 wherein R is a phenyl radical.

17. The process of claim 14 wherein R is a mercaptopropyl radical.

18. The process of claim 14 wherein the silsesquioxane is a copolymer of 70–95% by weight of $CH_3SiO_{3/2}$ units and 5–30% by weight of $HS(CH_2)_3SiO_{3/2}$ units.

19. The process of claim 14 wherein the silsesquioxane is a copolymer of 70–95% by weight of $CH_3SiO_{3/2}$ units and 5–30% by weight of $H_2NCH_2CH_2NH(CH_2)_3SiO_{3/2}$ units.

20. A fibrous material containing on at least a portion of its surface as the sole agent to impart anti-slip, dulling and/or dry-soiling resistance thereto, a solid silsesquioxane having the unit formula $RSiO_{3/2}$, wherein R is a member selected from the group consisting of hydrocarbon and substituted-hydrocarbon radicals containing from 1 to 7 carbon atoms, said silisesquioxane having been prepared by emulsion polymerization and having a particle size in the range of 10 to 1,000 A.

21. The fibrous material of claim 20 wherein R is a methyl radical.

22. The fibrous material of claim 21 wherein the material is glass.

23. The fibrous material of claim 20 wherein R is an ethyl radical.

24. The fibrous material of claim 20 wherein the material is a fabric and the silsesquioxane has a particle size in the range of 10 to 400 A.

25. The fabric of claim 24 wherein R is a methyl radical.

26. The fabric of claim 25 wherein the fabric is glass.

27. The fabric of claim 24 wherein R is an ethyl radical.

28. The fibrous material of claim 20 wherein the material is carpeting.

29. The carpeting of claim 28 wherein the silsesquioxane has a particle size in the range of 10 to 400 A.

30. The carpeting of claim 29 wherein R is a methyl radical.

31. The carpeting of claim 29 wherein R is a mercaptopropyl radical.

References Cited

UNITED STATES PATENTS

| 2,891,920 | 6/1959 | Hyde et al. | 260—29.2 |
|---|---|---|---|
| 3,294,725 | 12/1966 | Findlay et al. | 260—29.2 |
| 2,465,188 | 3/1949 | Barry et al. | 260—448.2 |
| 2,588,366 | 3/1952 | Dennett | 117—161 |
| 2,597,614 | 5/1952 | Brown et al. | 117—161 X |
| 3,017,386 | 1/1962 | Brown et al. | 260—465 |
| 3,112,265 | 11/1963 | Yuille | 117—139.5 X |
| 3,162,614 | 12/1964 | Katchman | 260—46.5 |

FOREIGN PATENTS 653,707   12/1962   Canada.

OTHER REFERENCES

Barry et al.; "Crystalline Organo Silsesquioxanes," Journal of the American Chemical Society, Nov. 22, 1954, vol. 77, pp. 4248-4252.

WILLIAM D. MARTIN, Pramry Examiner

M. R. P. PERRONE, Assistant Examiner

U.S. Cl. X.R.

117—138.8, 141, 143, 161; 260—29.2, 29.6, 46.5